United States Patent

[11] 3,619,752

| [72] | Inventor | Gediminas Bateika<br>Grotzingen, Baden-Wurttemberg,<br>Germany |
|---|---|---|
| [21] | Appl. No. | 793,719 |
| [22] | Filed | Jan. 24, 1969 |
| [45] | Patented | Nov. 9, 1971 |
| [73] | Assignee | G.M. Pfaff AG, Kaiserslauternam<br>Pfalz, Germany |
| [32] | Priority | June 1, 1968 |
| [33] | | Germany |
| [31] | | P 17 63 460.5 |

[54] PULSATING CURRENT CONTROL SYSTEM FOR SERIES MOTORS AND THE LIKE USING A CONTROLLED RECTIFIER
6 Claims, 1 Drawing Fig.

| [52] | U.S. Cl. | 318/331 |
|---|---|---|
| [51] | Int. Cl. | H02p 5/16 |
| [50] | Field of Search | 318/331, 341, 345 |

[56] References Cited
UNITED STATES PATENTS

| 3,226,627 | 12/1965 | Fromkin | 307/301 |
|---|---|---|---|
| 3,177,418 | 4/1965 | Meng | 318/345 |
| 3,358,205 | 12/1967 | Wechsler | 318/345 |
| 3,336,517 | 8/1967 | Cain | 318/345 |
| 3,177,417 | 4/1965 | Wright | 318/331 |
| 3,283,234 | 11/1966 | Dinger | 318/331 |
| 3,293,523 | 12/1966 | Hutson | 318/331 |

Primary Examiner—Oris L. Rader
Assistant Examiner—Thomas Langer
Attorney—Greene & Durr ABSTRACT: In a series-wound motor speed control system comprising a solid state controlled rectifier connected in series with the motor and a source of pulsating rectified current, the rectifier is controlled by a synchronized unijunction transistor triggering pulse former including an RC timing network. The time position of the triggering pulses is subject to a threefold control, namely, a manual control, by varying the resistance of the network, to adjust the motor speed, a first automatic control in dependence upon variations of the motor load, and a second automatic control depending upon supply voltage variations, to maintain the adjusted motor speed constant independently of said variations.

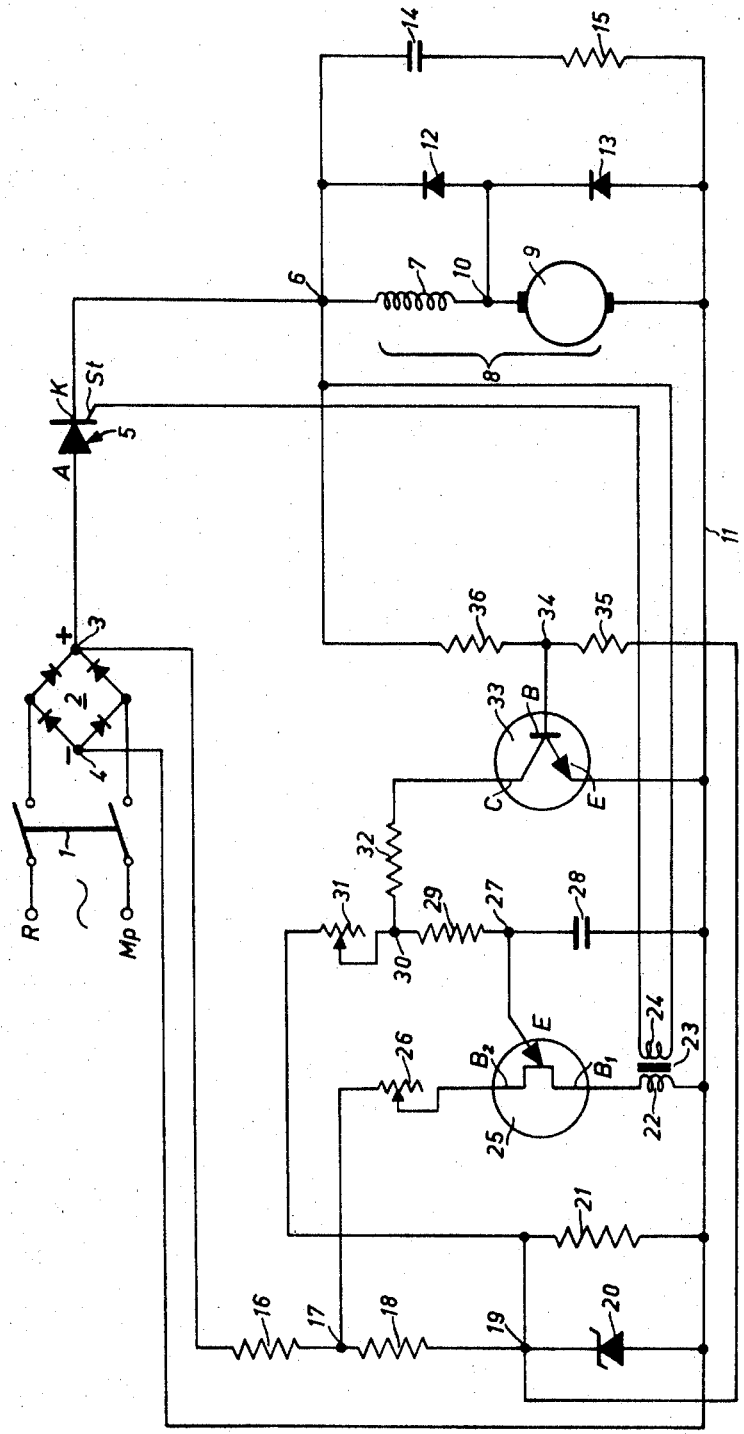

PULSATING CURRENT CONTROL SYSTEM FOR SERIES MOTORS AND THE LIKE USING A CONTROLLED RECTIFIER

The present invention relates to pulsating current control systems for varying the load current or speed of a series-wound motor or the like appliance energized or operated by rectified pulsating current and controlled by means of a solid state controlled rectifier, or electronic switching device, commonly known as thyristor or SCR (silicon controlled rectifier) in the art.

It has already become known to utilize the armature back EMF of a series motor, having its speed controlled by means of a controlled rectifier, to maintain the adjusted motor speed independently of load variations. Systems of this type have been found to be relatively complicated and bulky, not to mention costly, while where more simplified stabilizing arrangements are used, the speed or load stabilizers based upon utilization of the armature back EMF, is found incapable of complying with generally existing operating conditions or requirements.

An important object of the present invention is, therefore, the provision, aside from the normal control of the load current by varying the resistance of the timing network, of relatively simple and efficient stabilizing means to maintain the adjusted speed substantially constant, independently of load and/or supply voltage changes or fluctuations.

A more specific object of the invention is the provision of a control system of the referred to type which will enable a greater and more efficient utilization of the armature back EMF of a series motor for effecting a speed stabilization.

The invention, both as to the foregoing and ancillary objects as well as novel aspects thereof, will be better understood from the following detailed description, taken in conjunction with the accompanying drawing forming part of this specification and showing the wiring diagram of a preferred motor speed control and stabilization system constructed in accordance with the principles of the invention.

With the foregoing objects in view, the invention, according to one of its aspects, involves generally the provision of a series motor having its speed adjusted by a solid state controlled rectifier connected in a known manner in series with the armature and field windings of the motor and a source of rectified pulsating supply voltage of either the single or double alternation type. The gate or control electrode of the rectifier is excited by the output pulses produced by a separate synchronized unijunction transistor triggering pulse generator including an RC timing network and being energized and controlled, by way of a Zener diode stabilizer, by said source, to produce firing voltage pulses for the emitter of the transistor in synchronism with the supply voltage pulsations. A threefold control of the timing positions of the firing pulses serves, respectively, for manually adjusting the load current and in turn the speed of the motor by controlling the resistance of said network, and for automatically varying the timing of the pulses in dependence upon both load or speed and supply voltage variations, in such a manner as to maintain the adjusted speed constant, substantially independently of load and supply voltage changes or fluctuations.

More particularly, for the latter purposes, the charging current of the capacity of the timing network is variably shunted or deviated through the emitter-collector path of a voltage-responsive impedance in the form of a two-junction transistor having its base controlled by the armature back EMF of the motor, on the one hand, and the operating voltage on the unijunction transistor is caused to fluctuate in accordance with the variations of the supply voltage, on the other hand, in a manner as will become further apparent and understood as the description proceeds in reference to the drawing.

Connected, through a main control switch 1, to the terminals R and Mp of an alternating current supply source are the input terminals of a bridge-type rectifier 2 from the output terminals 3 and 4 of which is derived a pulsating direct current or voltage. Connected to terminal 3 of the rectifier 2 is the anode A of a controlled rectifier 5 (SCR, thyristor, etc.) which further comprises a cathode K and a gate or control electrode St. The cathode K in connected, via a junction point 6, to one end of the field winding 7 of a series-wound motor 8 having an armature winding 9.

The field winding 7 and armature winding 9 of the motor 8 are connected in series via a junction point 10, while the opposite end of the armature 9 winding in connected, by way of a lead 11, to the remaining output terminal 4 of the rectifier 2. Connected in parallel to the field winding 7 and armature winding 9 are diodes 12 and 13, respectively, the cathode of the diode 12 being connected to junction 6, while its anode and the cathode of diode 13 are both connected to the junction 10 and anode of diode 13 is connected to the lead 11. Connected between the junction 6 and the lead 11 is a series network comprised of capacitor 14 and a resistor 15.

Further connected to terminal 3 of the rectifier 2 is a series or voltage drop resistor 16 which is in turn connected, via a junction point 17, to a control resistor 18. The latter is in turn connected, via a further junction point 19, to one terminal of a Zener diode 20 the opposite terminal of which is connected to the lead 11. Shunted across the Zener diode or connected between the junction 19 and the lead 11 is a further resistor 21. Resistors 16 and 18 and the Zener diode 20 constitute a voltage divider circuit connected across the output terminals 3 and 4 of the rectifier 2.

Further connected to the lead 11 is one end of the primary winding 22 of a triggering pulse transformer 23 having a secondary winding 24 which is connected to the gate St of the rectifier 5 and junction point 6, respectively.

The remaining end of the primary winding 22 of the triggering transformer is connected to the first base electrode $B_1$ of a unijunction transistor 25 having a cooperating second base electrode $B_2$ connected, via a trimmer resistor 26, to the junction point 17. The unijunction transistor 25 of conventional design further comprises an emitter E intermediate its bases $B_1$ and $B_2$.

The unijunction transistor has the well known property that the current flow between its emitter E and the base $B_1$ remains blocked or interrupted as long as the impressed control voltage of the emitter is below a critical (peak-point) voltage or factional value of the operating voltage applied to the bases $B_1$ and $B_2$. As soon as the voltage impressed upon the emitter E exceeds the critical voltage, the unijunction transistor fires by the breakdown of the path $B_1$–$B_2$ initiated by the current flow between the emitter E and base $B_1$, in a manner well known. This condition persists until the output or current is sufficiently reduced or interrupted, that is, at or towards the ends of the supply voltage pulsations.

The emitter E of the unijunction transistor 25 is connected, by way of a junction point 27, to one electrode of a timing capacitor 28 which has its remaining electrode connected to the lead 11. Further connected to the junction point 27 in one end of a timing resistor 29 whose opposite end is connected, via a further junction 30 and speed control resistor 31, to the junction point 19, on the one hand and, by way of a further resistor 32, to the collector C of a conventional two-junction transistor 33, on the other hand, said transistor 33 further comprising an emitter E, connected to the lead 11, and a base B. The latter is connected, via a junction point 34 and a fixed resistor 35, to the junction 19, on the one hand, and, via a further fixed resistor 36, to the junction point 6, on the other hand.

In the arrangement described in the foregoing, the unijunction transistor 25 functions as a separate synchronized triggering pulse generator for the thyristor or SCR5, including an RC timing network 28, 29, 31 with the capacitor 28 of said network being charged, during successive pulsations of the rectified current, by a constant voltage produced by the Zener diode 20 to the firing voltage of the emitter E, to effect the breakdown of the interbase path $B_1$–$B_2$ and, in turn, to trigger the thyristor or SCR 5 via transformer 23, the timing of the triggering pulses and in turn the width of the supply current pulses through the motor being controlled by the variable control resistor 31, to correspondingly adjust the load current or operating speed of the motor.

More particularly, closing of the switch 1 results in the setting up of a pulsating direct-current voltage at the output terminals 3 and 4 of the rectifier 2, the shape of the pulsations corresponding to those of the alternating current supply voltage, that is, being in the form of sine-shaped half-waves or pulsations. The Zener diode 20 provides a stable control voltage at the junction point 19 applied, by way of the control resistor 31 and fixed resistor 29 to the timing capacitor 28 and emitter E of the unijunction transistor 25.

The shunt resistor 21 across the Zener diode serves to bypass spurious or stray voltages occurring in the blocking direction of the diode.

In the arrangement described in the foregoing, the base $B_2$ of the unijunction transistor 25 receives its voltage from the junction 17 between the series resistor 16 and the control resistor 18. The provision of the latter enables the utilization of the output voltage variations of the rectifier, resulting from supply voltage changes, for the automatic control of the firing time position of the unijunction transistor, in such a manner that with increasing voltage at the terminal 3 the voltage at the junction point 17 and, in turn, at the base $B_2$ increases proportionately, whereby to result in an increase of the voltage between the bases $B_1$ and $B_2$. As a consequence, with other conditions remaining constant, the firing of the transistor 25 is delayed, thereby reducing the average current supply to the motor via the rectifier 5, or counteracting the assumed increase of the supply voltage at the terminal 3. On the other hand, a reduction of the voltage at the terminal 3 results in an advance of the firing point, whereby to increase the length of the current pulses supplied to the motor. In this manner, a substantially constant load current and in turn a constant motor speed, adjusted by the resistor 31, is maintained substantially independently of supply voltage variations.

The trimmer resistor 26 connected in series with the base $B_2$ of the unijunction transistor 25 serves to adjust the operating point of the transistor, to compensate for manufacturing variations of the intrinsic-stand-off ratio of the transistor which in turn determines the peak-point or critical transistor firing voltage.

In operation, the stabilized control voltage appearing at the junction point 19 causes a current flow via the control resistor 31 and fixed resistor 29, charging thereby the capacitor 28. As soon as the junction point 27, and, in turn, the emitter E of the junction transistor reaches the firing potential of the latter, the transistor fires or breaks down, to thereby initiate the discharge of the capacitor 28 via the primary winding 22 of the triggering transformer 23. Adjustment of the control resistor 31 enables the firing time position of the transistor and in turn the triggering instants of the rectifier 5 to be controlled within close limits for the adjustment of the load current or operating speed of the motor, respectively.

More particularly, the discharge current of the capacitor 28 passing through the primary 22 causes a voltage to be induced in the secondary 24, whereby to bias the gate St of the rectifier 5 to initiate its breakdown at the respective instant within the supply voltage pulsations. As a consequence, the motor is energized by a series of current pulsations of varying widths, resulting in a corresponding average load current and corresponding speed depending upon the adjustment of the control resistor 31.

Aside from the adjustment by the control resistor 31, the speed of the motor 8 also depends upon the torque or load imposed by the driven device or appliance, such as a sewing machine. More particularly, as the load, assuming a fixed adjustment of the control resistor 31, increases the speed decreases and, vice versa as the load or torque decreases, the motor speed is increased. According to the present invention, the motor speed is stabilized, or maintained at the desired or adjusted valve, by the utilization of the armature back EMF in the manner described in the following.

As the load or torque imposed on the motor decreases, its speed increases, assuming a constant adjustment of the control resistor 31. As a consequence, the correspondingly increased armature back EMF, generated as result of the residual field of the field winding 7, increases the positive bias upon the base B of the transistor 33, said base being steadily biased by the Zener diode 20 via the resistor 35. This, in turn, causes a decrease of the emitter-collector impedance of the transistor and an increased deviation of the charging current of the capacity 28 produced by the constant Zener voltage. Firing the unijunction transistor 25 and, in turn, triggering of the rectifier 5, is delayed thereby, thus reducing the widths of the supply current pulses applied to the motor and, in turn, causing a reduction of the motor speed counteracting the initial assumed speed increase.

Similarly, as the torque or load on the motor increases, its speed decreases, resulting in a reduced bias of the base B of the transistor 33 due to the corresponding reduction of the armature back EMF. As a consequence, the impedance of the emitter-collector path of the transistor 33 increases, resulting thereby in reduced deviation or bypassing of the charging current of the capacity 28, or advancement of the firing point of the unijunction transistor 25. The resultant decrease of the widths of the supply current pulses of the rectifier 5 causes an increase of the motor speed counteracting the initial assumed speed reduction.

As a result of the aforementioned automatic control, the motor speed, adjusted by the control resistor 31, is maintained constant or stabilized substantially independently of the motor load or imposed torque changes. This, combined with the previously described stabilization, to overcome the effect of supply voltage variations, results in a highly reliable and efficient motor speed control of a series motor or the like load energized or operated by rectified pulsating current.

Alternatively, resistor 36 may be connected to point 10, to apply the armature back EMF to the control electrode of transistor 33. The connection shown to point 6 has the advantage of the field winding 7 acting as a choke suppressing interfering voltages in the control signal produced in the armature 9 or caused by sparking of the collector contacts of the motor.

Capacitor 14 and resistor 15 act to steady or smoothen the armature back EMF applied to the base of transistor 33, while diodes 12 and 13 serve to suppress the inductive or kickback voltage produced in the field and armature windings at the instants of interruption or extinction of the supply current pulses by the rectifier. Besides, the RC-network 14, 15 acts to suppress high-frequency interference produced in the winding 9 or due to sparking of the collector contacts. Another function of the network 14, 15 is to provide a parallel resonant circuit in conjunction with the inductance of the motor 8 to reduce or eliminate delays in the thyristor firing.

In the foregoing the invention has been described in reference to a preferred exemplary embodiment. It will be evident, however, that variations and modifications, as well as the substitution of equivalent parts and devices for those shown for illustration may be made without departing from the boarder purview and spirit of the invention. The specification and drawing are accordingly to be regarded in an illustrative rather than in a restrictive sense.

I claim:

1. A control system for a series-wound electric motor comprising:
   1. a solid state controlled rectifier having cathode, anode, and gate electrodes,
   2. a source of pulsating voltage,
   3. means connecting said source in series with said motor and the anode-cathode path of said rectifier,
   4. a unijunction triggering transistor having first base, second base and emitter electrodes,
   5. voltage divider means connected to said source including a Zener diode, to provide a first operating voltage varying in accordance with source voltage fluctuations and a second operating voltage stabilized by said diode, 6. means to apply said first operating voltage to the first and second base of said transistor,
7. a resistance-capacitance timing network energized by said second operating voltage and having its common junction connected to said emitter electrode,
8. a triggering transformer having a primary winding connected in the output circuit of said transistor and a secondary winding connected to said gate,
9. means to control the resistance of said network for adjusting the operating speed of said motor,
10. a voltage-responsive variable impedance in effective shunt relation to the capacitance of said network, and
11. means to control said impedance in dependence upon variations of the armature back EMF of said motor.

2. A motor control system as claimed in claim 1, wherein the resistance of said timing network comprises a fixed resistor in series with a variable resistor for controlling the motor speed.

3. A motor control system as claimed in claim 1, including a trimmer resistor connected in the output circuit of said unijunction transistor.

4. A motor control system as claimed in claim 1, wherein said voltage divider means comprises a pair of resistors in series with other and said Zener diode and wherein said first operating voltage is derived from the junction of said fixed resistors and said second operating voltage is derived from the junction of said diode with the adjoining fixed resistor.

5. A motor control system as claimed in claim 1, wherein said variable impedance consists of a two-junction transistor having emitter, base and collector electrodes and arranged with its emitter-collector path effectively bypassing the capacitance of said timing network and with its base operably connected to the armature of said motor.

6. A motor control system as claimed in claim 1, wherein said pulsating current source consists of a rectifier bridge having its coordinated input terminals connected to an alternating current supply networks.

* * * * *